(12) United States Patent
Laursen et al.

(10) Patent No.: US 7,813,714 B2
(45) Date of Patent: Oct. 12, 2010

(54) APPARATUS FOR ACCESSING A COMMON DATABASE FROM A MOBILE DEVICE AND A COMPUTING DEVICE

(75) Inventors: Andrew L. Laursen, San Mateo, CA (US); Bruce K. Martin, Jr., Palo Alto, CA (US); Alain S. Rossmann, Palo Alto, CA (US)

(73) Assignee: Openwave Systems Inc., Redwood City, CA (US)

( * ) Notice: Subject to any disclaimer, the term of this patent is extended or adjusted under 35 U.S.C. 154(b) by 157 days.

(21) Appl. No.: 11/875,544

(22) Filed: Oct. 19, 2007

(65) Prior Publication Data
US 2008/0039062 A1 Feb. 14, 2008

Related U.S. Application Data

(60) Division of application No. 10/870,852, filed on Jun. 16, 2004, now Pat. No. 7,328,030, which is a division of application No. 09/410,859, filed on Oct. 1, 1999, now Pat. No. 6,895,234, which is a continuation of application No. 08/987,346, filed on Dec. 9, 1997, now Pat. No. 6,065,120.

(51) Int. Cl.
*H04M 11/00* (2006.01)
*H04W 72/00* (2009.01)
*H04B 1/38* (2006.01)

(52) U.S. Cl. ............ 455/405; 455/406; 455/456.1; 455/566; 705/2; 705/42; 709/203; 709/217; 709/218; 709/229; 709/223; 713/169; 713/171

(58) Field of Classification Search ............ 455/406, 455/456, 405, 566; 709/217, 218, 203, 229, 709/223; 713/169, 171; 705/2, 42; 345/738
See application file for complete search history.

(56) References Cited

U.S. PATENT DOCUMENTS

| 5,321,840 | A | 6/1994 | Ahlin |
| 5,434,918 | A | 7/1995 | Kung |
| 5,610,910 | A | 3/1997 | Focsaneanu |
| 5,673,322 | A | 9/1997 | Pepe |
| 5,689,642 | A | 11/1997 | Harkins |
| 5,689,825 | A | 11/1997 | Averbuch |
| 5,703,942 | A | 12/1997 | Pinard |
| 5,708,780 | A | 1/1998 | Levergood |
| 5,717,923 | A | 2/1998 | Dedrick |

(Continued)

*Primary Examiner*—William D Cumming

(57) ABSTRACT

The present invention has been made in consideration of thin devices efficiently communicating ideas and transactions into data networks by using other devices with full functional user interface in the networks. According to one aspect of the present invention, the thin device exclusively controls the authentication of a rendezvous that is associated with a user account in a server. The thin device running a micro-browser provisions the rendezvous with a set of credential information in an authenticated and secure communication session so that the provisioning process is truly proprietary. To access the user account, the other devices equipped with well-known browsers must submit the correct credential information to the rendezvous for verification in the server. Once admitted, the other devices can update managed information in the user account, individually and respectively, thereby the thin device is able to conduct desired transactions based on the managed information in the user account without the need to key in pertinent information of the transactions.

8 Claims, 12 Drawing Sheets

U.S. PATENT DOCUMENTS

| | | | |
|---|---|---|---|
| 5,721,827 A | 2/1998 | Logan | |
| 5,727,159 A | 3/1998 | Kikinis | |
| 5,732,074 A | 3/1998 | Spaur | |
| 5,740,430 A | 4/1998 | Rosenberg | |
| 5,742,905 A | 4/1998 | Pepe | |
| 5,754,939 A | 5/1998 | Herz | |
| 5,764,235 A | 6/1998 | Hunt | |
| 5,796,832 A | 8/1998 | Kawan | |
| 5,802,276 A | 9/1998 | Benantar | |
| 5,805,159 A | 9/1998 | Bertram | |
| 5,805,803 A | 9/1998 | Birrell | |
| 5,809,415 A | 9/1998 | Rossmann | |
| 5,815,665 A | 9/1998 | Teper | |
| 5,825,759 A | 10/1998 | Liu | |
| 5,828,833 A | 10/1998 | Belville | |
| 5,835,577 A | 11/1998 | Disanto | |
| 5,838,682 A | 11/1998 | Dekelbaum | |
| 5,844,972 A | 12/1998 | Jagadish | |
| 5,848,161 A | 12/1998 | Luneau | |
| 5,857,201 A | 1/1999 | Wright, Jr. | |
| 5,862,325 A | 1/1999 | Reed | |
| 5,862,330 A | 1/1999 | Anupam | |
| 5,862,339 A | 1/1999 | Bonnaure | |
| 5,867,153 A | 2/1999 | Grandcolas | |
| 5,867,661 A | 2/1999 | Bittinger | |
| 5,884,312 A | 3/1999 | Dustan | |
| 5,887,171 A | 3/1999 | Tada | |
| 5,890,155 A | 3/1999 | Steinman | |
| 5,896,444 A | 4/1999 | Perlman | |
| 5,901,287 A | 5/1999 | Bull | |
| 5,903,845 A | 5/1999 | Buhrmann | |
| 5,905,251 A | 5/1999 | Knowles | |
| 5,907,547 A | 5/1999 | Foladare | |
| 5,918,019 A | 6/1999 | Valencia | |
| 5,923,756 A | 7/1999 | Shambroom | |
| 5,926,624 A | 7/1999 | Katz | |
| 5,926,636 A | 7/1999 | Lam | |
| 5,954,799 A | 9/1999 | Goheen | |
| 6,065,120 A | 5/2000 | Laursen | |
| 6,169,992 B1 | 1/2001 | Beall | |
| 6,178,433 B1 | 1/2001 | Nakamura | |
| 6,233,608 B1* | 5/2001 | Laursen et al. | 709/217 |
| 6,263,437 B1* | 7/2001 | Liao et al. | 713/169 |
| 6,317,781 B1 | 11/2001 | De Boor | |
| 6,317,831 B1* | 11/2001 | King | 713/171 |
| 6,377,886 B1 | 4/2002 | Gotou | |
| 6,473,609 B1* | 10/2002 | Schwartz et al. | 455/406 |
| 6,597,903 B1* | 7/2003 | Dahm et al. | 455/405 |
| 6,606,663 B1* | 8/2003 | Liao et al. | 709/229 |
| 6,610,105 B1 | 8/2003 | Martin | |
| 6,684,087 B1* | 1/2004 | Yu et al. | 455/566 |
| 6,795,708 B1 | 9/2004 | Patel | |
| 6,895,234 B1* | 5/2005 | Laursen et al. | 455/403 |
| 6,981,061 B1* | 12/2005 | Sakakura | 709/248 |
| 7,003,284 B2* | 2/2006 | Schwartz et al. | 455/414.1 |
| 7,225,249 B1* | 5/2007 | Barry et al. | 709/227 |
| 7,328,030 B2* | 2/2008 | Laursen et al. | 455/466 |
| 7,337,219 B1* | 2/2008 | Meenan et al. | 709/220 |
| 7,373,395 B2* | 5/2008 | Brailean et al. | 709/219 |
| 7,383,339 B1* | 6/2008 | Meenan et al. | 709/227 |
| 7,428,585 B1* | 9/2008 | Owens et al. | 709/223 |
| 2001/0039503 A1* | 11/2001 | Chan et al. | 705/2 |
| 2002/0080166 A1* | 6/2002 | Sweatt et al. | 345/738 |
| 2002/0083153 A1* | 6/2002 | Sweatt et al. | 709/218 |
| 2002/0152267 A1* | 10/2002 | Lennon | 709/203 |
| 2002/0160790 A1* | 10/2002 | Schwartz et al. | 455/456 |
| 2002/0188565 A1* | 12/2002 | Nakamura et al. | 705/42 |
| 2004/0064351 A1* | 4/2004 | Mikurak | 705/7 |
| 2004/0229595 A1* | 11/2004 | Laursen et al. | 455/403 |
| 2005/0008132 A1* | 1/2005 | Paschini et al. | 379/93.12 |
| 2005/0216421 A1* | 9/2005 | Barry et al. | 705/64 |
| 2005/0283478 A1* | 12/2005 | Choi et al. | 707/9 |
| 2006/0008256 A1* | 1/2006 | Khedouri et al. | 386/124 |
| 2006/0010199 A1* | 1/2006 | Brailean et al. | 709/204 |
| 2006/0224470 A1* | 10/2006 | Garcia Ruano et al. | 705/27 |
| 2007/0094691 A1* | 4/2007 | Gazdzinski | 725/62 |
| 2007/0136445 A1* | 6/2007 | Sweatt et al. | 709/219 |
| 2007/0162945 A1* | 7/2007 | Mills | 725/119 |
| 2007/0171921 A1* | 7/2007 | Wookey et al. | 370/401 |
| 2007/0174410 A1* | 7/2007 | Croft et al. | 709/208 |
| 2007/0174429 A1* | 7/2007 | Mazzaferri et al. | 709/218 |
| 2007/0179955 A1* | 8/2007 | Croft et al. | 707/9 |
| 2007/0180447 A1* | 8/2007 | Mazzaferri et al. | 718/1 |
| 2007/0180448 A1* | 8/2007 | Low et al. | 718/1 |
| 2007/0180449 A1* | 8/2007 | Croft et al. | 718/1 |
| 2007/0180450 A1* | 8/2007 | Croft et al. | 718/1 |
| 2007/0180493 A1* | 8/2007 | Croft et al. | 726/2 |
| 2007/0186212 A1* | 8/2007 | Mazzaferri et al. | 718/1 |
| 2007/0192329 A1* | 8/2007 | Croft et al. | 707/10 |
| 2007/0198656 A1* | 8/2007 | Mazzaferri et al. | 709/218 |
| 2007/0250920 A1* | 10/2007 | Lindsay | 726/7 |
| 2007/0276925 A1* | 11/2007 | La Joie et al. | 709/219 |
| 2007/0276926 A1* | 11/2007 | LaJoie et al. | 709/219 |
| 2008/0021730 A1* | 1/2008 | Holla et al. | 705/2 |
| 2008/0039062 A1* | 2/2008 | Laursen et al. | 455/419 |
| 2008/0040782 A1* | 2/2008 | Laursen et al. | 726/5 |
| 2008/0125067 A1* | 5/2008 | Bells et al. | 455/187.1 |
| 2008/0155057 A1* | 6/2008 | Khedouri et al. | 709/217 |
| 2008/0155109 A1* | 6/2008 | Khedouri et al. | 709/229 |
| 2008/0155129 A1* | 6/2008 | Khedouri et al. | 710/8 |
| 2008/0155470 A1* | 6/2008 | Khedouri et al. | 715/810 |
| 2008/0155634 A1* | 6/2008 | Khedouri et al. | 725/118 |
| 2008/0160910 A1* | 7/2008 | Khedouri et al. | 455/3.06 |
| 2008/0176540 A1* | 7/2008 | Khedouri et al. | 455/414.1 |
| 2008/0177662 A1* | 7/2008 | Smith et al. | 705/44 |
| 2008/0177860 A1* | 7/2008 | Khedouri et al. | 709/217 |
| 2008/0178238 A1* | 7/2008 | Khedouri et al. | 725/109 |
| 2008/0201375 A1* | 8/2008 | Khedouri et al. | 707/104.1 |
| 2008/0201376 A1* | 8/2008 | Khedouri et al. | 707/104.1 |
| 2008/0205616 A1* | 8/2008 | Teng et al. | 379/202.01 |
| 2008/0209491 A1* | 8/2008 | Hasek | 725/114 |
| 2008/0212944 A1* | 9/2008 | Khedouri et al. | 386/124 |
| 2008/0212945 A1* | 9/2008 | Khedouri et al. | 386/124 |
| 2008/0222417 A1* | 9/2008 | Downes et al. | 713/172 |
| 2008/0301778 A1* | 12/2008 | Fritz et al. | 726/4 |
| 2008/0305738 A1* | 12/2008 | Khedouri et al. | 455/3.06 |
| 2009/0024488 A1* | 1/2009 | Romley | 705/26 |

* cited by examiner

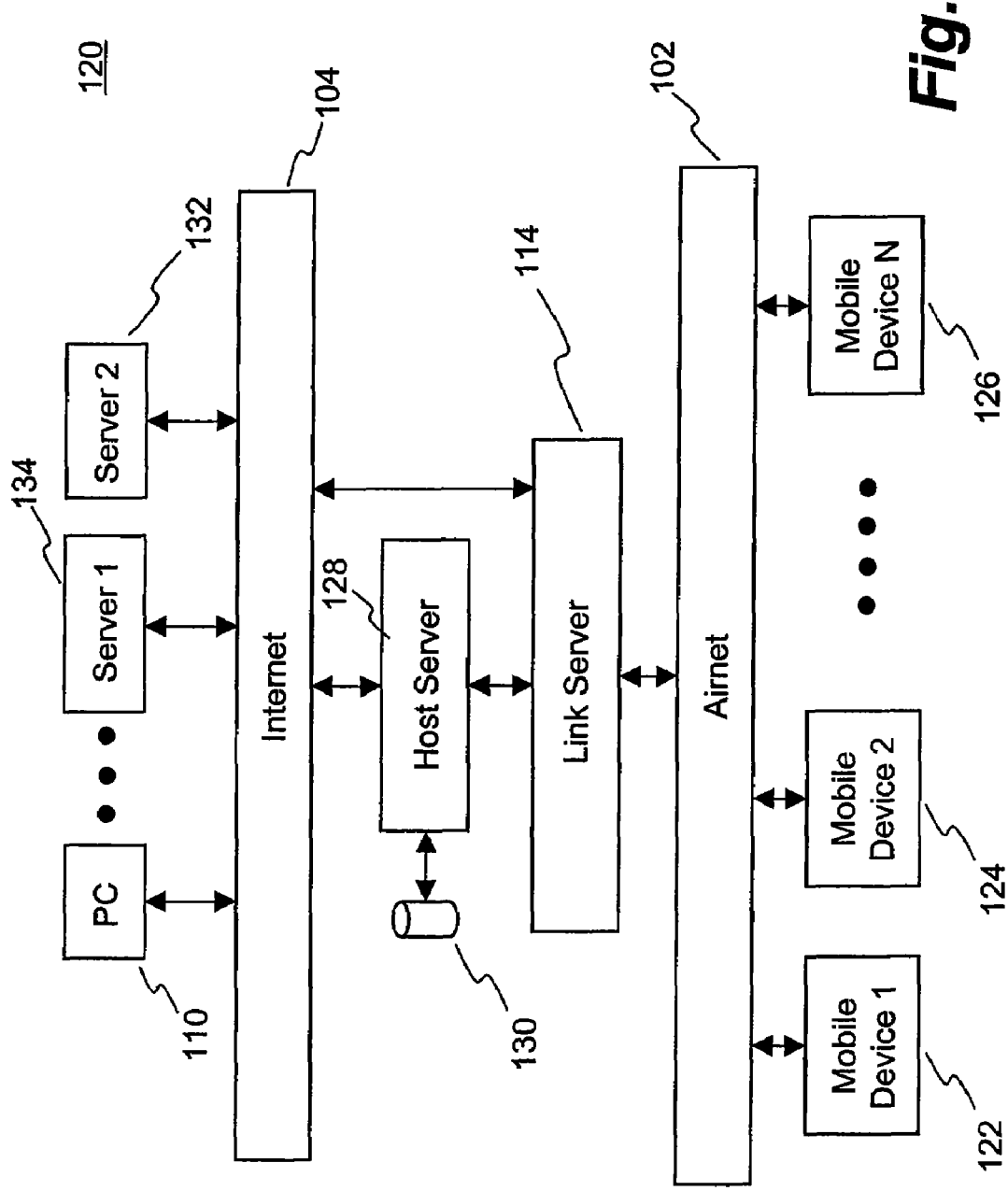
Fig. 2.a

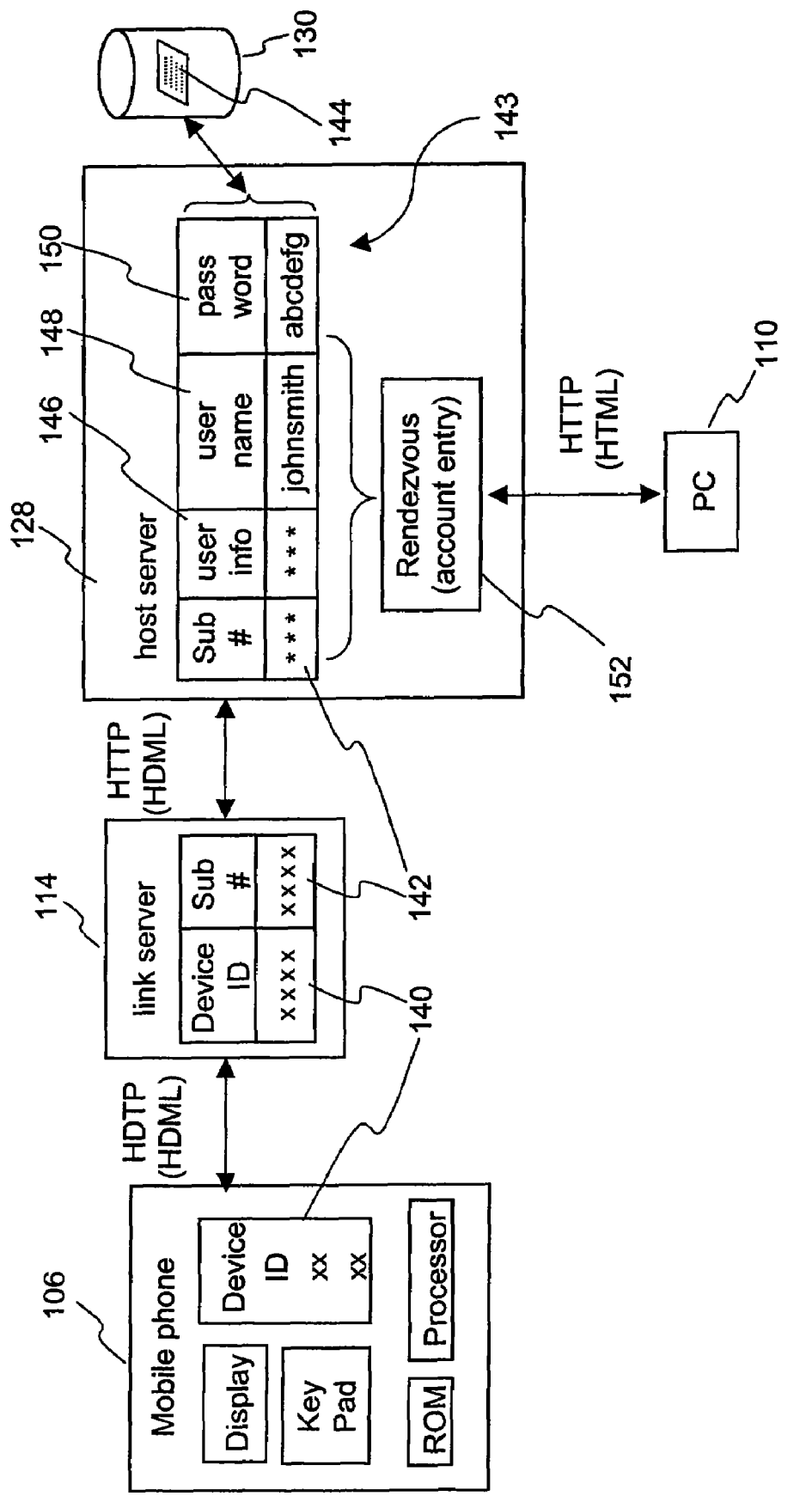

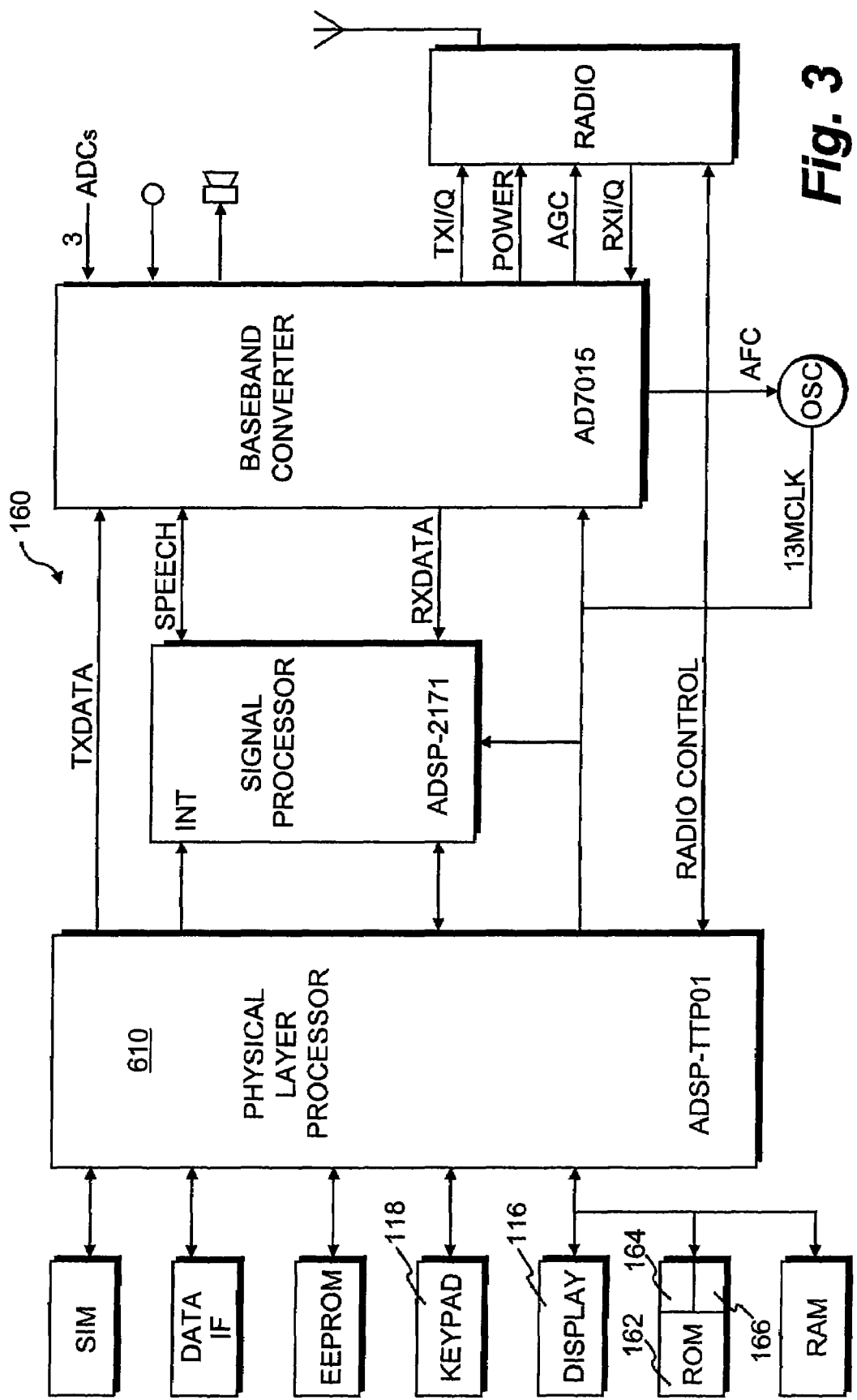

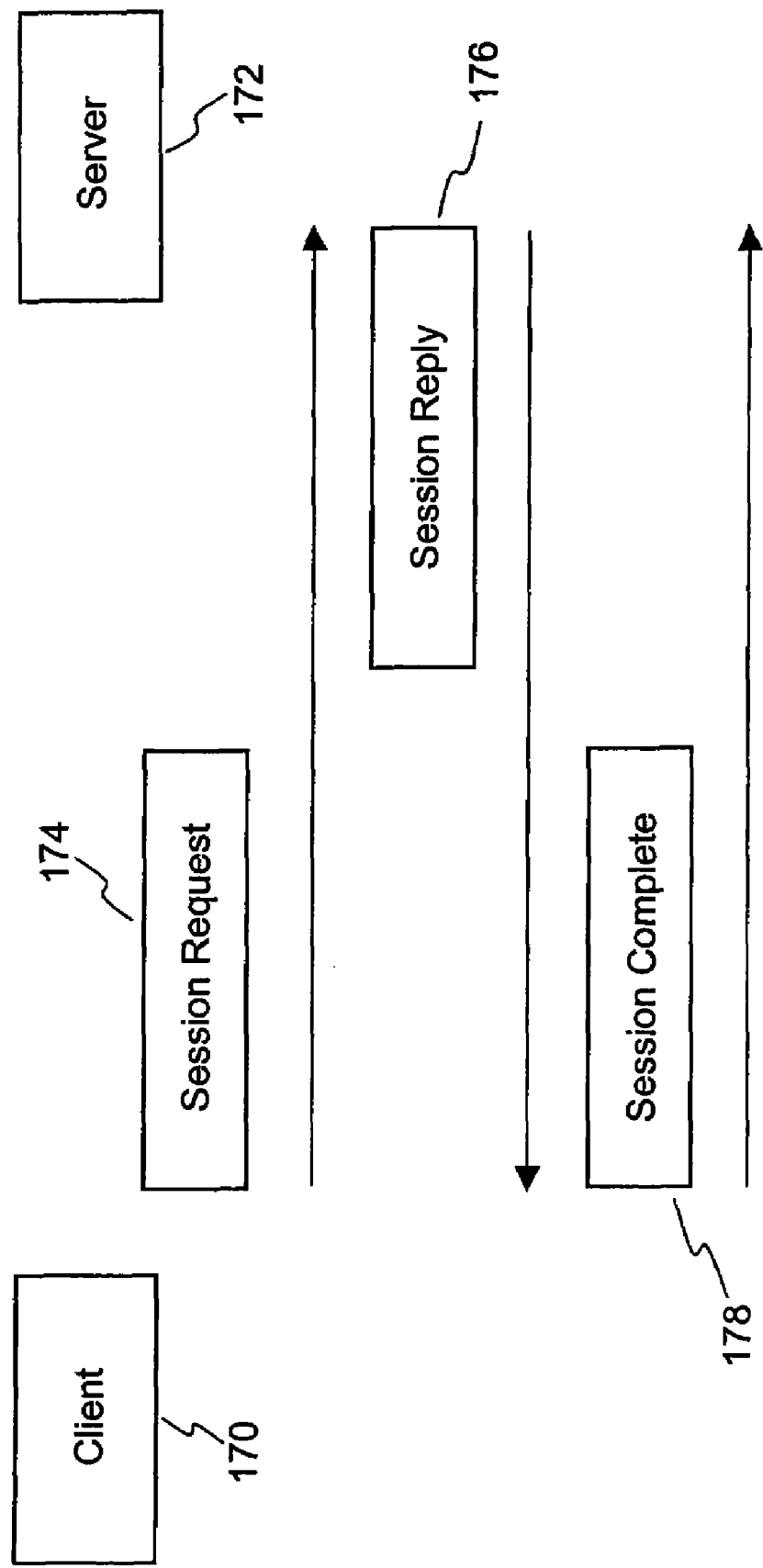

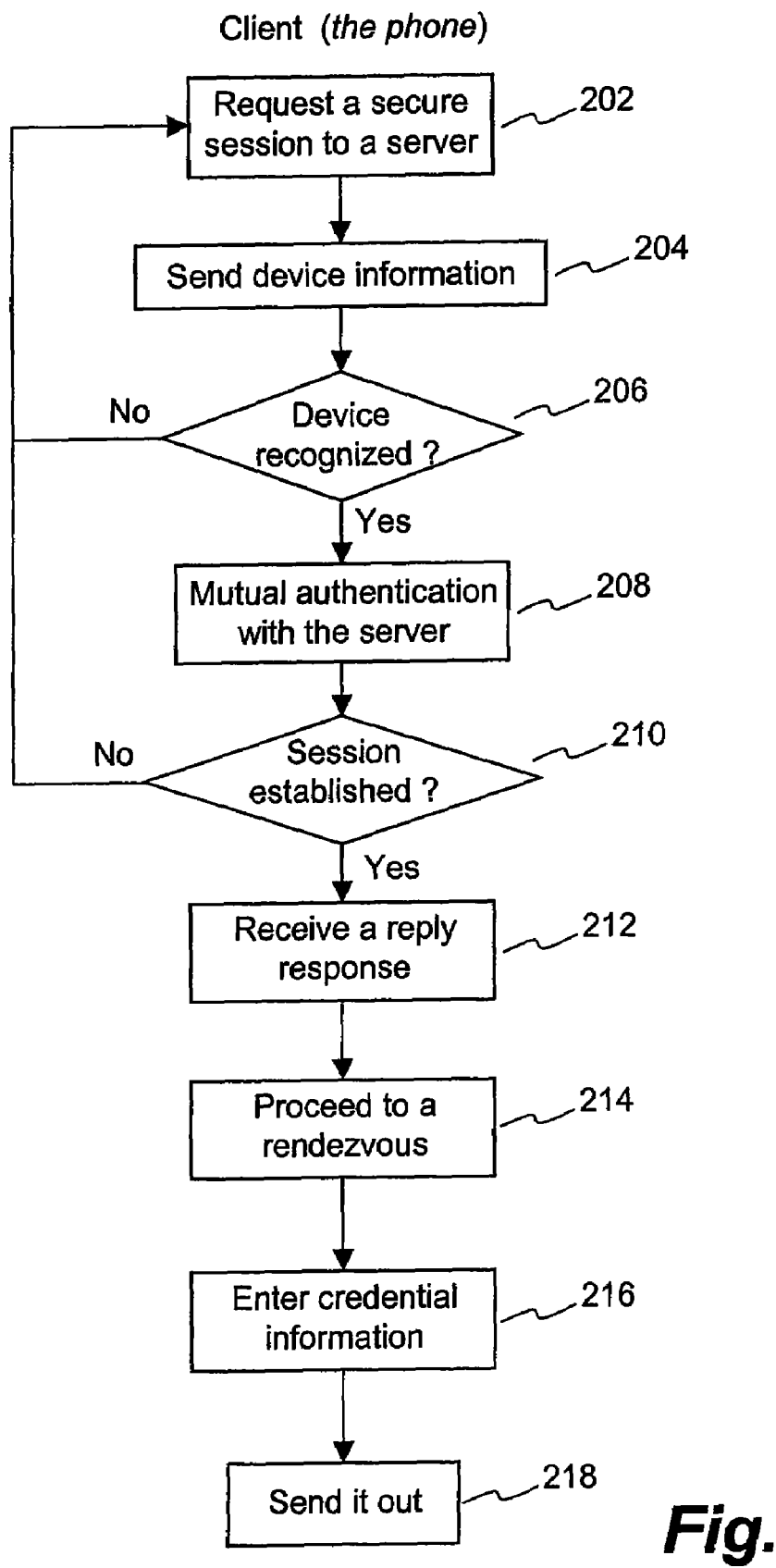
Fig. 5.a

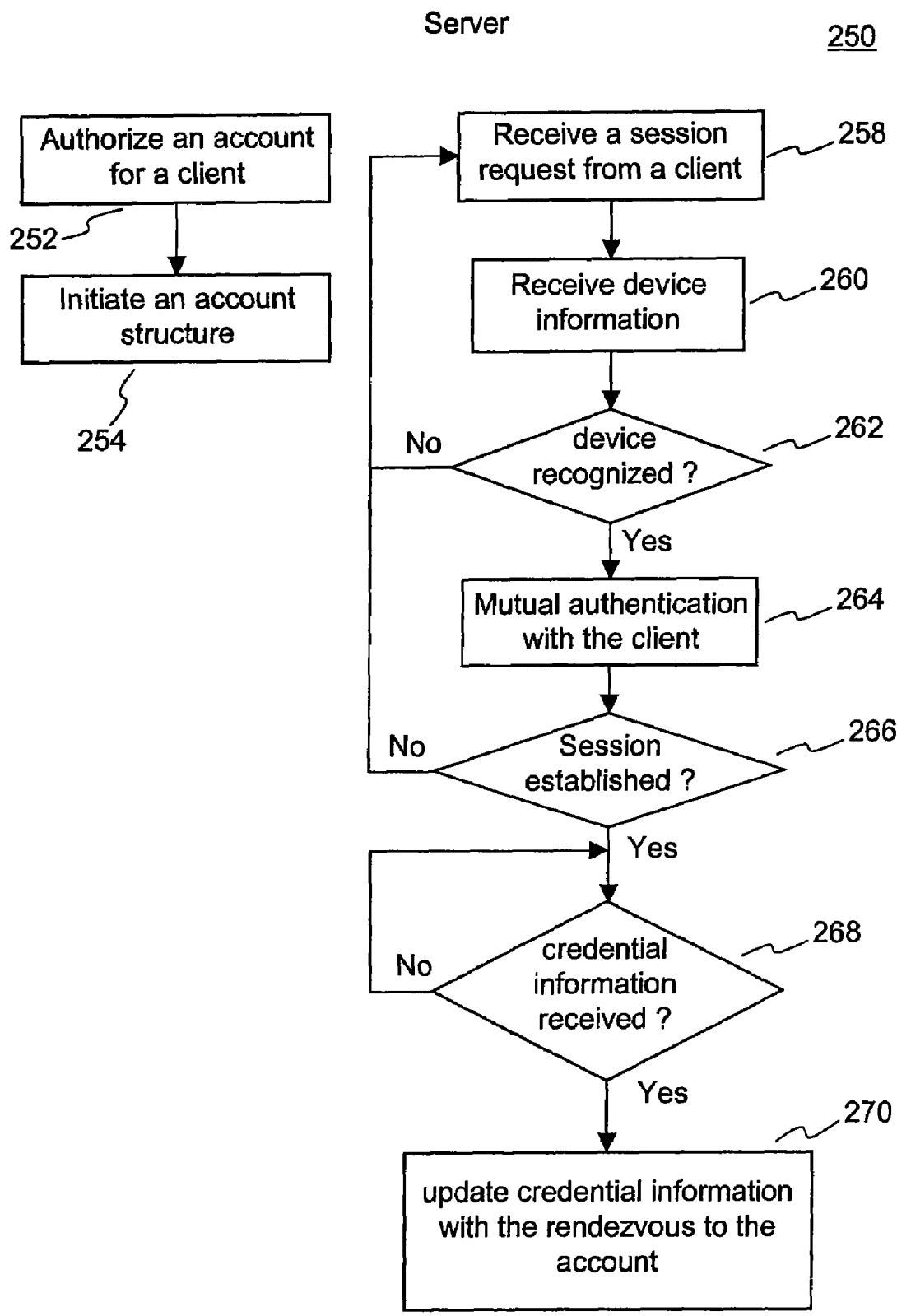
Fig. 5.b

US 7,813,714 B2

APPARATUS FOR ACCESSING A COMMON DATABASE FROM A MOBILE DEVICE AND A COMPUTING DEVICE

CROSS-REFERENCE TO RELATED APPLICATIONS

This application is a divisional application of U.S. application Ser. No. 10/870,852, filed on Jun. 16, 2004, now allowed; which is a divisional U.S. application Ser. No. 09/410,859, filed on Oct. 1, 1999, now U.S. Pat. No. 6,895,234, which is a continuation of application Ser. No. 08/987,346, filed on Dec. 9, 1997, now U.S. Pat. No. 6,065,120, which is hereby incorporated herein by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyrights whatsoever.

BACKGROUND OF THE INVENTION

1. Field of the Invention

The invention relates to user authentication systems over data network systems and, more particularly, relates to a method and system for self-provisioning, through a first device, a rendezvous to ensure secure access to managed information in a user account by other devices through the rendezvous in a data network, wherein the rendezvous is generally identified by a URL, the first device, coupled to the data network, runs a first browser under a first communication protocol and the other devices in the same data network run a second browser under a second communication protocol.

2. Description of the Related Art

The Internet is a rapidly growing communication network of interconnected computers around the world. Together, these millions of connected computers form a vast repository of hyperlinked information that is readily accessible by any of the connected computers from anywhere and anytime. To provide mobility and portability of the Internet, wireless computing devices were introduced and are capable of communicating, via wireless data networks, with the computers on the Internet. With the wireless data networks, people, as they travel or move about, are able to perform through the wireless computing devices exactly the same tasks they could do with computers on the Internet.

The most common remote access paradigm is, as of today, the one in which a laptop personal computer is equipped with a wireless communication mechanism, for example, a wireless modem. This paradigm may remain useful for a considerable number of applications and users, but there has been a growing need for a mobile paradigm in which the Internet can be instantly accessed by mobile devices, such as cellular phones and personal digital assistants. The mobile devices are generally designed small in size and light in weight. With increasing data processing capabilities in the mobile devices, more and more users start carrying the devices around to materialize their unproductive time into productive time. As more commonly seen, regular mobile phones can return calls, check voice mail or make users thereof available for teleconferences anywhere and anytime, but desired mobile phones, not just reactive to calls but also proactive, can meld voice, data, and personal information with manager-like functionality into a single handset that can effectively, through a host computer, access a myriad of public and enterprise information services in the Internet.

The evolution of the mobile phones or the mobile devices has been fueled by the demand of users for immediate access to the information they are looking for. For example, a traveler may request an exact flight schedule when he is on his way to the airport, or a trader may purchase shares of stock at a certain price. The pertinent information from these transactions may include the airline and the flight number for the traveler, or the number and price of the shares being purchased by the trader. To be timely informed, a preferable way is to communicate the information requests electronically into the wireless data network. The data network, for example, connects to a flight information server or stock quote server so that the desired flight information or the current stock price can be retrieved therefrom on demand. However, it becomes troublesome or impractical to key in lengthy information queries electronically into the data network through a mobile device that typically has a keypad with a few buttons, much less functional compared to a keyboard in a personal computer system. There is, therefore, a great need for a method and system for efficiently communicating desired transactions into a data network through which the transactions can be performed or pertinent information can be retrieved, without the need to key in such information every time the transactions or the information is desired. In many cases, the desired information in a user account, especially regarding personal matters, is preferred to be confidential. Thus, there is further a need for a generic solution that provides a method and means for self-provisioning an account entry to a user account that has the proprietary information therein accessible only through the account entry.

SUMMARY OF THE INVENTION

The invention pertains to improved approaches for accessing data on a data network by a mobile device or a computing device. Typically, the mobile device (e.g., mobile telephone with a network browser) has a limited functionality user interface as compared with the full functionality user interface of the computing device (e.g., personal computer).

The invention can be implemented in numerous ways, including as a method, system, apparatus, and computer readable medium. Several embodiments of the invention are discussed below.

As a method for accessing data contained in a data network system, one embodiment of the invention includes the acts of: sending a request to a server hosting the data to retrieve the data by activating a key of a mobile device, the request being sent by executing a first set of program instructions in the mobile device, wherein the mobile device has a display screen and is in communication over a wireless data network with the server, and further, wherein the data is associated with the mobile device and is also accessible by a computing device executing a second set of program instructions and coupled to the server through a data network; receiving the data from the server via the wireless data network, the data presented in a first format interpretable by the first set of program instructions; and displaying the data on the display screen of the mobile device.

As a computer readable medium including at least computer program code, executable in a mobile device having a display screen, for accessing data contained in a data network system, one embodiment of the invention includes at least: computer program code for sending a request over a wireless data network to a server hosting the data, the data being associated with the mobile device and accessible by a computing device coupled to the server through a data network; computer program code for receiving the data from the server via the wireless data network, the data received presented in a first format displayable by the mobile device and presented in a second format when accessed by the computing device; and computer program code for displaying the data on the display screen of the mobile device.

As a computer readable medium including at least computer program code executable in a server hosting data, the data accessible by a mobile device executing a first browser and by a computing device executing a second browser, wherein the mobile device is coupled to the server through a wireless network and the computing device is coupled to the server through a data network, one embodiment of the invention includes at least: computer program code for receiving a request from the mobile device through the wireless network to access the data; computer program code for retrieving the data; and computer program code for forwarding the data to the mobile device in a first format displayable on the display screen of the mobile device.

BRIEF DESCRIPTION OF THE DRAWINGS

These and other features, aspects, and advantages of the present invention will become better understood with regard to the following description, appended claims, and accompanying drawings where:

FIGS. 2.a and 2.b illustrate representations of the system architecture of the present invention and a layout of a corresponding user account in a server in communication with a mobile phone and a PC;

FIG. 3 shows a typical example of a mobile device that houses one portion of the linked and compiled processes disclosed in the present invention;

FIG. 4 illustrates a schematic representation of a mutual authentication process between a mobile device and a host server to ensure subsequent information transacted therebetween is secured;

FIGS. 5.a and 5.b are flowchart representations showing the corresponding processes in each of the involved devices.

DETAILED DESCRIPTION OF THE INVENTION

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

The following detailed description of the present invention is presented largely in terms of procedures, steps, logic blocks, processing, and other symbolic representations that resemble the operations of data processing devices coupled to networks. These process descriptions and representations are the means used by those experienced or skilled in the art to most effectively convey the substance of their work to others skilled in the art. The present invention is a method and system for self-provisioning a rendezvous through a thin device to ensure secure access by other devices to information in a database in a data network. The method, along with the system or architecture to be described in detail below, is a self-consistent sequence of steps leading to a desired result. These steps or processes are those requiring physical manipulations of physical quantities. Usually, though not necessarily, these quantities may take the form of electrical signals capable of being stored, transferred, combined, compared, displayed and otherwise manipulated in a computer system or electronic computing systems. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and are merely convenient labels applied to these quantities. Unless specifically stated otherwise as apparent from the following description, it is appreciated that throughout the present description, discussions utilizing terms such as "processing," "computing," "verifying," "displaying," or the like, refer to the actions and processes of a computing system that manipulates and transforms data represented as physical quantities within the computing device's registers and memories into other data similarly represented as physical quantities within the computing device or other such device, such as storage, transmission or display devices.

Figure 1:
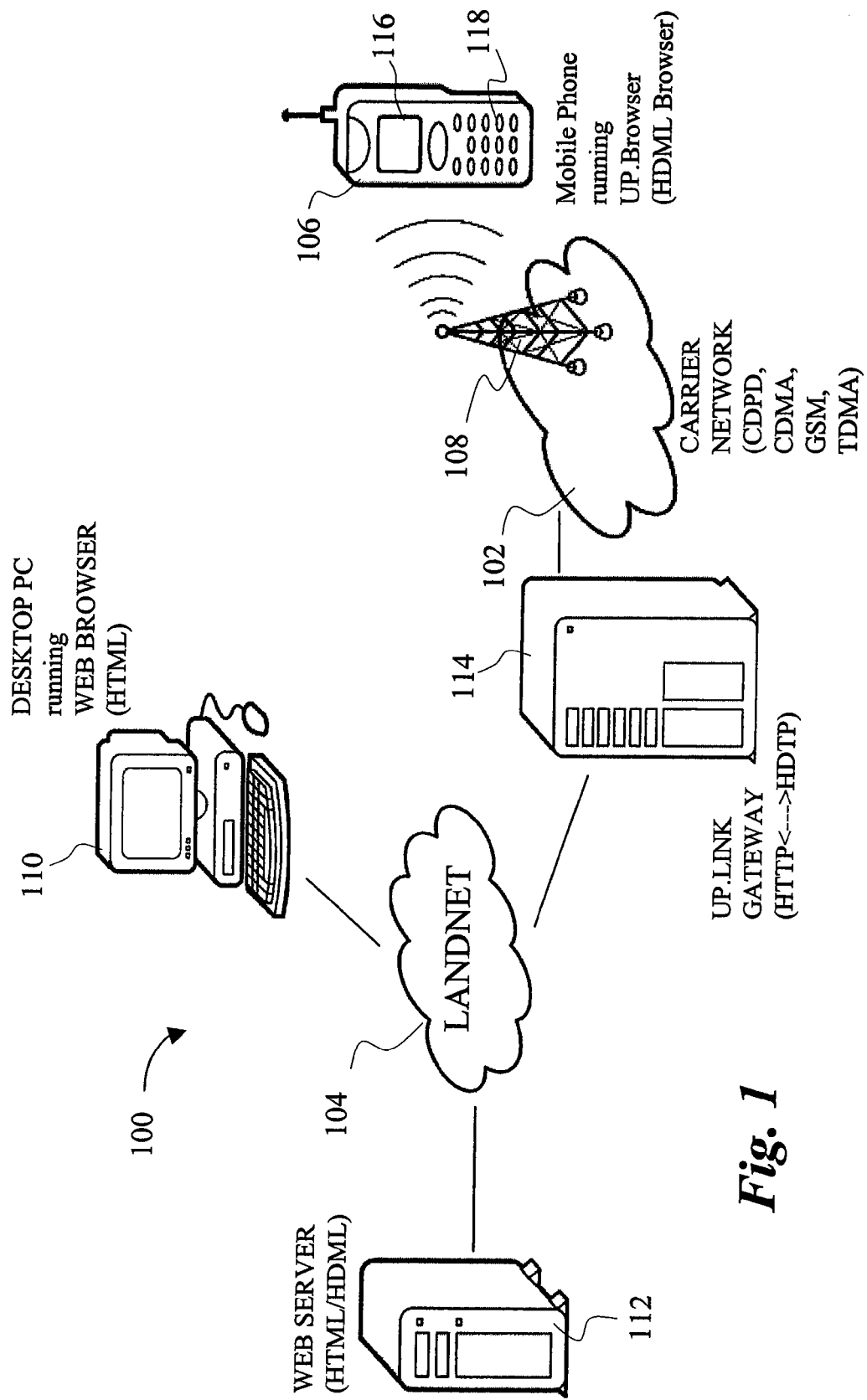
FIG. 1 shows a schematic representation of a data network in which the present invention may be practiced.

Referring now to the drawings, in which like numerals refer to like parts throughout the several views. FIG. 1 shows a schematic representation of a data network 100 in which the present invention may be practiced. The data network 100 comprises an airnet 102 that is generally called a wireless network, and a landnet 104 that is generally a landline network, each acting as a communication medium for data transmission therethrough. The airnet 102, in which transmission is via the air, is sometimes referred to as a carrier network because each airnet is controlled and operated by a carrier, for example, AT&T and GTE, each having its own communication scheme, such as CDPD, CDMA, GSM and TDMA, for the airnet 102. The landnet 104 or the Internet, used interchangeably herein, may be the Internet, an intranet or other private networks. Referenced by 106 is a mobile data device, but resembling a mobile phone therein, in communication with the airnet 102 via an antenna 108. It is generally understood that the airnet 102 communicates simultaneously with a plurality of mobile computing devices of which only a mobile or cellular phone 106 is shown in the figure. Similarly, connected to the Internet 104 are a plurality of desktop PCs 110 and a plurality of servers 112, though only one representative is shown in the figure. The PC 110, as shown in the figure, may be a personal computer and runs a HTML Web browser via the Internet 104 using HTTP to access information stored in the web server 112 which may be a workstation. It is understood by those skilled in the art that the PC 110 can store accessible information therein so as to become a web server as well. Between the Internet 104 and the airnet 102 there is a link server 114 performing data communication between the Internet 104 and the airnet 102. The link server 114, also referred to as a link proxy or gateway, may be a workstation or a personal computer and performs mapping or translation functions, for example, communication protocol mapping from one protocol to another, thereby a mobile device 106 can be in communication with any one of the servers 112 or the PCs 110.

The communication protocol in the Internet 104 is the well known HyperText Transfer Protocol (HTTP) and runs on TCP and controls the connection of a well known HyperText Markup Language Web browser, (HTML Web browser), to a Web server and the exchange of information therebetween. The communication protocol between the mobile device 106 and the link server 114 via the airnet 102 is Handheld Device Transport Protocol (HDTP) or Secure Uplink Gateway Protocol (SUGP), which preferably run on User Datagram Protocol (UDP) and controls the connection of a HDML Web browser to a link server and a set of commands or statements that specify how information is displayed. HDML stands for Handheld Device Markup Language, which is similar to that of HTML. The specifications of both HDTP and HDML, being considered as the wireless network standards, are available for additional details. Further, a reference specification entitled "Magellan SUGP Protocol," a HTTP specification with network security features, is incorporated herein by U.S. Pat. No. 6,065,120. HDTP is a session-level protocol that resembles HTTP but without incurring the overhead thereof and is highly optimized for use in mobile devices that have significantly less computing power and memory. Further, it is understood by those skilled in the art that the UDP does not require a connection to be established between a client and a server before information can be exchanged, which eliminates the need for exchanging a large number of packets during a session between a client and a server. Exchanging a very small number of packets during a transaction is one of the desired features for a mobile device with very limited computing power and memory to effectively interact with a landline device.

Referring now to FIGS. 2.a and 2.b, there is depicted a representation of the architecture 120 of the present invention. As described above, the airnet 102 communicates simultaneously with a plurality of two-way mobile communication devices, 122, 124 and 126, generally from a group consisting of mobile phones, two-way pagers and telephones. Due to the increasing reduction in size and weight and high portability, most of the mobile devices, considered as thin clients, have a very limited computing power, typically equivalent to less than one percent of what is provided in a typical desktop or portable computer. The memory capacity in a thin client is generally less than 250 kilobytes and the LCD display thereof is perhaps four lines high by twelve or twenty characters, the graphics capabilities thereof are very limited or nearly nonexistent and the general user interface is a keypad having far less buttons than a PC keyboard. Therefore, many transactions desired by users through such clients are preferably predetermined or pre-entered in their user accounts in a host server 128. As such, the users need only to select desired transactions to perform or at most key in one or two letters corresponding to desired entries through the keypads of their cellular phones. For example, if there is a list of stock symbols of interest in a user account that is designated to a mobile phone, a user of the mobile phone will not have to key in the symbols every time he desires to look up the price thereof currently being traded in the stock market. The list of stock symbols is previously entered to the user account. Evidently, the most available and convenient means for now is to use a computing device that has powerful and full functional information entering capabilities. A PC is a typical example of such computing device, the PC can be equipped with the well-known HTML browser that provides a rich graphic user interface and an ideal environment for the user to manage his personalized information in his account.

As is well known, the Internet 104 is typically a landline network connecting computers that utilize the HTML browser. Referenced by 110 is a PC representing one of the computers that use the HTML browser running on HTTP to hyperlink to other computers/servers 132 or 134 to update/ fetch information on line or simply copy files therefrom. It should be noted that "user account" and "database" have been used herein sometimes interchangeably when only one account is being addressed. It is generally understood that a database or an allocation of memory, as referenced by 130 in the FIGS. 2.a and 2.b, hosts a plurality of user accounts, each designated to an authorized capacity in which managed or personalized information is kept. Further, it is understood that the database 130 can be an independent storage or physically a part of the host server 128. To access the personalized information therein from any computer on the Internet 104, one has to provide an account entry, namely a rendezvous, to a user account in the host server 128 or database 130 with a set of credential information such as a username and a password. FIG. 2.b illustrates a layout of a typical user account assigned with a mobile phone 106. Each mobile phone is assigned to a device ID 140 which can be a phone number of the phone or a combination of an IP address and a port number, for example: 204.163.165.132:01905; where 204.163.165.132 is the IP address, and 01905 is the port number. The device ID 140 is further associated with a subscriber number 142 authorized by a carrier in the link server 114 as part of the procedures to activate the phone 106. The subscriber number may take the form, for example, of 861234567-10900 pn.mobile-.att.net by AT&T WIRELESS SERVICE, it is a unique identification to the phone 106. In other words, each of the mobile devices 122, 124 and 126 of FIG. 2.a has a unique device ID that corresponds to a user account in a server. It may be appreciated by those skilled in the art that the link server 114 does not have to be a separate server to perform the communication protocol mapping, it can be a part of the host server 128 and the protocol mapping is part of the functions the host server 128 provides.

A corresponding account 144 in the database 130 is indexed by an account structure 143 comprising subscriber number 142, user information 146, a username 148 and a password 150. Subscriber number 142 is received from the link server 114 as an index to the account structure 143. The user information 146 comprises the account configuration and other account related information. The username 148 and the password 150, namely, the user credential information, control the authentication to enter the account 144 in the database 130. From the data network perspective, any computer can logon through HTTP to the rendezvous 152 identified by an address identifier, often a universal resource locator (URL) taking the form of www.xyz.com. In other words, each account in a database is exclusively associated with a rendezvous identified by a unique URL. As shown in the figure, the PC 110 establishes a communication session with the rendezvous 152 based on a given URL of the rendezvous 152. However, to access the associated account 144 in the database 130, the PC 110 must provide a set of a correct username and password to the rendezvous 152 that performs a verification thereof with the account structure 143. If the supplied username and password match those in the account structure 143, the access requested by the PC 110 is allowed. Otherwise, entry to the account 144 is denied.

The PC 110 can update information stored in the account 144 when the supplied username and password are verified. Using the powerful and familiar HTML browser in the PC 110, a user can key in frequently requested information, such as a list of stock symbols and a list of URLs of Web servers that provide services to the phone 106. All the information entered through the PC 110 becomes immediately available to the phone 106.

A process named webpwd.cpp in the code listing in the appended Microfiche Appendix A illustrates a provisioning process between the phone 106 and the link server 114 in one embodiment of the present invention. Upon the request of the phone 106, the process, specifically in a subprocess called setNameAndPasswordState( ), allows the phone 106 to supply a username and a password and then send the newly supplied credential information to a second subprocess called submitState( ) that checks if the entered username and password are acceptable, namely the username and password should have a certain length and contain no spaces or unrecognized characters with respect to a general rule of being a username and password. If the username and password are not acceptable, the subprocess submitState( ) returns to the phone 106 with a corresponding message being either "You must enter a name" or "You must enter a password." Otherwise, the newly entered username and password are sent to another subprocess called SetUserAuth( ) in a process called HTTPDBMSUserDB. The subprocess SetUserAuth( ) updates the username and password in the account structure 143, which immediately requires all subsequent logins to the rendezvous 152 with the newly supplied username and password. A subprocess Authenticate( ) examines a set of a username and password supplied by the PC 110 and compares the username and password from the PC 110 to the ones in the account structure 143. If the comparison is successful, the subprocess Authenticate( ) returns a AuthPass flag that allows the PC 110 to access the account in the database. Otherwise, it returns a flag that denies the admission of the PC 110 to the account.

It should be noted that the communication between the phone 106 and the link server 114 is through the airnet 102 as shown in FIGS. 1 and 2.a. Messages carrying proprietary information traveling in the air are not secure. To transact credential information over the open space to provision the rendezvous, a user must have an efficient, reliable and secured manner to conduct private communications with the link server. According to one embodiment of the present invention, an authenticated and secure session between the cellular phone 106 and the link server 114 must be in place before the cellular phone provisions the rendezvous through which the user accesses his/her account from other computers. It is necessary to refer to an architecture of a mobile phone before proceeding with the detailed description of creating the authenticated and secure communication between a user's phone (client) and a server. FIG. 3 is a block diagram of a typical GSM digital cellular phone 160. Each of the hardware components in the cellular phone 160 is known to those skilled in the art and so the hardware components are not described in detail herein. Although the user interface of the phone 160 is not shown in detail in the figure, the phone 160 may be the mobile device 118 of FIG. 1, having a LCD screen 116 and a key pad 118. The screen 116 prompts a user to proceed with the keypad 118 with a sequence of key entries, and through the phone 160, a user can interactively communicate with a server through the airnet, link server and the Internet. According to one embodiment of the present invention, compiled and linked processes of the present invention are stored in ROM 162 as a client module 164 and support module 166. Upon activation of a predetermined key sequence utilizing the keypad 118, a physical layer processor or microcontroller 610 initiates a session communication to the server using the module 164 in the ROM 162.

To establish a secured communication between a cellular phone (a client) and a server, an authentication process must be conducted first to ensure that only interested parties are actually in the communication therebetween. According to one embodiment of the present invention, the code listing thereof being provided in the appended Microfiche Appendix, the process is complete through two rounds of independent authentication, one being the client authenticated by the server, referred to as client authentication, and the other being the server authenticated by the client, referred to as server authentication. Further, each authentication is completed in two separate steps for a high grade of security, which will be described in detail below. The success of the mutual authentication processes provisions and evidences that the two communicating parties possess a valid shared secret encrypt key through a mutual decryption and a challenge/response mechanism. The mutual decryption mechanism comprises the steps of mutually recovering encrypted messages from two involved communicating parties. The challenge/response mechanism, referred to as nonce verification, verifies a predetermined relationship between a sent nonce and a received derivative thereof.

In one preferred embodiment of the present invention, the authentication process is conducted with three message exchanges; a Session Request (SR) 174, a Session Reply (SP) 176, and a Session Complete (SC) 178. FIG. 4 illustrates a schematic representation of the authentication process. Representing a mobile device or the cellular phone 106 of FIG. 1, the client 170 conducts a transaction with the server 172, such as the link server 114 of FIGS. 2.a and 2.b, and initiates a Session Request 174 to be sent to the server 172 by first creating a client proto-session. A client proto-session is a session data structure that is initialized when a session creation starts. The initialized Session Request 174 comprises the following essential information:

sessionID—an identifier identifying all requests from the client to the server; in the case of requesting a session creation, sessionID is always assigned to 0;

cipher—a two-byte number representing the choice of the encryption the client is currently using as there are a number of encryption schemes available in a communication protocol;

deviceID—a variable up to 255-bytes, representing the device identifier or the client identifier, comprising a phone number of the device or an IP address and a port number, e.g., 204.163.165.132:01905;

C-nonce—a client nonce represented with a non-repeatable number, usually 2 bytes, used for the client to conduct a following server authentication; and C-nonceModified—a modified version of the client nonce, used for the server to conduct a nonce verification in the following client authentication.

Further, the cipher in the Session Request 174 includes an identifier to an encryption algorithm and associated parameters thereof. To be more specific, the first byte in the cipher represents an identifier to a combination of the encryption algorithm, the key size (e.g., 128-bit for the U.S. or 40-bit for foreign countries) and content of a security attachment thereto; and the second byte in the cipher indicates the additional parameters related to the first byte. For example, value 1 in the first byte indicates that the encryption algorithm is block cipher RC5, the key size thereof is 128 bit, a two byte check-sum therein is used as the MAC (Message Authentication Code), no IV (Initialization Vector for block ciphers) therefor is transmitted over the network, and padding bytes are added if necessary. The block cipher algorithm RC5 is part of the RSA's BSAFE product. It can be further appreciated that the identifier in the cipher may be assigned to a unique value to identify a non-secure session if so desired. The C-nonce is a non-repeatable number initially and randomly generated in the client and the modified version thereof; C-nonceModified is generated from the C-nonce through an operational relationship. For example, the Exclusive-OR relationship or expressed as follows:

C-nonceModified=2-byte-number⊕C-nonce.

It can be appreciated by those who are skilled in the art that there are many ways to get the C-nonceModified from a C-nonce, the Exclusive-OR is one of the operational relationships used in one embodiment of the present invention. Both C-nonce and C-nonceModified are encrypted using the shared secret encrypt key between the client 170 and the server 172. The purpose of the C-nonceModified is to provide the server that receives the Session Request with means for ensuring that C-nonce is correctly decrypted and validated by examining the C-nonce and its relationship with the C-nonceModified. Both should not be altered after a successful decryption of the C-nonce and the C-nonceModified. In other words, a Session Request message or signal may be expressed as follows:

SR={session ID, cipher, device ID, Encry[nonce, nonceModified]};

where Encry[ ] means that the parameters or contents in the bracket are encrypted accordingly. When the Session Request is sent by the client to the server to request a session creation, both C-nonce and C-nonceModified are encrypted according to the cipher the client is using at the time the Session Request is sent out.

Upon receiving the Session Request from the client 170, the server 172 creates a server proto-session for the client 170 with a session identifier, referred to as session ID, to identify the session context for the session just created in the server 172. A server proto-session is a session entry marked as a proto status in a session table, which indicates that the session is not authenticated and is not able to conduct any transactions with the client. It is understood to those skilled in the art that the proto-session can be kept in the RAM of the server. If a proto-session already exists for that client, it is re-used. The information in the received Session Request is saved in the server proto-session. If the server 172 is satisfied with the fact that the client is known, namely Encry[C-nonce, C-nonce-Modified] in the received Session Request are successfully decrypted with the shared secret encrypt key, step one in the client authentication process is successful and a corresponding session key is generated and stored with the server proto-session entry. It may be noted herein that many encryption schemes used in this invention, such as the scheme utilizing RC5, have a procedure that adds and validates the Message Authentication Code, such as the check-sum, to assure that the encrypted message is correctly decrypted. The procedure, every time the decryption takes place, is used herein to examine the transaction integrity, namely to ensure the received messages or signals are unaltered in the cause of data transmission. If step one in the client authentication is not successful, namely, if Encry[C-nonce, C-nonceModified] in the received Session Request are not fully decrypted or supported, the proto-session is aborted and removed from the proto session table, resulting in a failed session creation. What the support means herein is the cipher proposed or used by the client is also used by the server, for example, the client uses the RC5 encryption to encrypt Encry[C-nonce, C-nonceModified]; to decrypt Encry[C-nonce, C-nonceModified], the server must be equipped with the same RC5 encryption capability therein. If Encry[C-nonce, C-nonceModified] can not be successfully decrypted due to other reasons such as transmission errors, the client must reinitiate a new session request to the server in order to establish a secure communication with the server. To challenge step two of server authentication subsequently at the client side, a derivative of the client nonce or C-nonce is generated therefor. In one embodiment of the present invention, the derivative is created by adding a constant to the client nonce, for example, derivative=C-nonce+1. The purpose of the derivative is to provide the client with means for reassuring that the C-nonce is correctly decrypted by the server and the server is the correct server with which the client should be in communication.

Right after the successful step one client authentication, the server 172 responds to the client with a Session Reply (SP) 176 to begin a second round of authentication; server authentication. The Session Reply 176 comprises the following information:

C-SID—a one byte number indicates the sessionID originally assigned in the client, to be more specific, C-SID=0 indicates a clear text client session, C-SID=1 indicates a shared secret key encrypted session, and C-SID=2 indicates a session key encrypted session. In the context of the current description, C-SID=1;

sessionID—a four-byte number representing an identification and parameters, such as a session encrypt key, of the session created by the server for the client;

key—a session key to be used with a mutually acceptable encryption, and to be used for encryption and decryption in all transactions in the session;

derivative—a number derived from the C-nonce for the client to perform the subsequent server authentication;

S-nonce—a non-repeatable number, used for the server to conduct a following step-two client authentication; it should be noted that S-nonce is generated by the server and generally different from the C-nonce by the client; and cipher—a two-byte number representing the choice of the encryption the server proposes after the client proposed cipher is received. It may or may not be the same as the one used in the client. To be more specific, the cipher is the same as the one proposed by the client when the server supports the client proposed cipher, otherwise the cipher is the one currently used in the server.

In other words, the Session Reply can be expressed as follows.

SP={C-SID, Encry[sessionID, key, S-nonce, derivative, cipher]}

When the client 170 receives the Session Reply 176 from the server 172, it performs the step one server authentication, which is considered successful if Encry[sessionID, key, S-nonce, derivative, cipher] in the received Session Reply 176 is decrypted successfully with the shared encrypt key. If the step one server authentication fails, the client 170 discards the Session Reply 176 and a new session creation may be started over again. Upon the success of the step one server authentication, the client 170 proceeds with the step two server authentication; namely, the predetermined relationship between the C-nonce and the derivative thereof should be held for a successful step-two server authentication.

C-nonce=derivative−1

If the C-nonce derived from the Session Reply 176 is the same as the C-nonce originally generated by the client, the step two server authentication is successful; hence, the server 172 is considered authenticated, trusted from the viewpoint of the client, and the Session Reply 176 is accepted as a valid message, which means that the client 170 then uses the session key and other information in the Session Reply 176 for the session being created. Only after completing both steps of the server authentication successfully, the client 170 marks the session as committed, which means that transactions can be conducted subsequently in the session, again only from the viewpoint of the client 170. If the predetermined relationship between the client nonce and the derivative thereof does not hold, the step two server authentication fails and the received Session Reply 176 is discarded. The client 170 may abort the session creation process if no further Session Replies are received and pass both steps of the server authentication process during the time period allowed for a session creation. To provide the server with means for reassuring the client authentication by itself through the client, a derivative of the S-nonce, similar to the derivative of the C-nonce, is generated.

The client 170 then sends the server 172 a Session Complete (SC) 178 to complete the session creation process. The Session Complete 178 comprises the following information:

SC={Encry[derivative]};

where the derivative is the client's response to the server nonce challenge, namely the result of the verification. The derivative is used by the server 172 for step two client authentication. Further, it is noted that the Session Complete 178 is an encrypted message, meaning that the client encrypts the information in the Session Complete 178 according to either its own cipher or the server proposed cipher. Generally the client 170 encrypts the information in the Session Complete 178 according to the server proposed cipher if it accepts the server proposed cipher, otherwise, it encrypts the Session Complete according to its own cipher.

Upon receipt of the Session Complete 178, the server 172 tests if the client 170 uses its own proposed cipher or the server proposed cipher by decrypting the Session Complete twice using the two ciphers if necessary. If the server 172 decrypts the encrypted message in the Session Complete 178 and verifies the relationship thereof with the S-nonce, the step two client authentication is considered successful. Subsequently, the server 172 promotes the server proto-session to the active session and the session creation process is completed, thereby an authenticated and secure communication session is established between the client and the server. Any transactions in the established communications session are now encrypted by the session key created in the server according to a cipher mutually agreed to by both the client and the server, thereby the transactions between the client and the server are truly proprietary. A code listing of one embodiment of the mutual authentication is listed in U.S. Pat. No. 6,233,608.

Referring now to FIGS. 5.a and 5.b, each illustrates a flowchart showing the processes of the present invention in each involved device, respectively, in conjunction with FIGS. 6, 7, 8, 9 and 10 demonstrating examples of personalizing a user account being accessed through a self-provisioned rendezvous. A client 200, which can be a cellular phone, in FIG. 5.a is one of the mobile devices communicating with a server 250 in FIG. 5.b through a data network similar to those illustrated in FIG. 1 or FIGS. 2.a and 2.b. It should be noted that the server 250 functions as a link server and a host server. The functional flowcharts on the client and server sides are conjointly described in the following with respect to a cellular phone. Nevertheless, it will be appreciated by those skilled in the art that a server, without reciting specifically a link server or a host server, as referenced by 250 can perform similar functions, this becomes evident when the client is a landline device having direct communication to the Internet.

As part of the procedures to activate a cellular phone, a user account, or sometimes called a device account, is created in the server 250, the account is exclusively associated with the phone or client 200. In other words, each mobile device in the data network has its own account identified by a corresponding device ID and subsequently a subscriber number in the server 250. The account for the client 200 is therefore created and configured at 252 according to services subscribed by the client 200. Meanwhile a corresponding account structure, similar to 143 in FIG. 2.b, is initiated at 254. With an established account in the server 250, the client 200 becomes one of the clients capable of communicating with any computers in a data network.

When a user desires to update his personalized information in his account, he needs to first self-provision the rendezvous associated with his account using the client 200. As is shown in FIG. 5.a, the phone therefore requests a communication session to the server 250 at 202 for subsequent transactions to take place in an authenticated and secure communication session. From the session creation described above, it can be appreciated that the session creation requested by the client 200 includes a piece of device information assigned to the client 200. The device information is sent at 204 to the host where a determination is made 206 whether the device information is recognized. If the device information is not recognized by the contacting host 250, no communication session can be possibly established therefor.

Meanwhile, as shown in FIG. 5.b, the host 250 receives the session request 258 from the client 200 as part of the session creation process. The device information is received at 260 and the session creation process proceeds when the device information is verified at 262, which means that the device 200 has an authorized account therein. At 208 and 264 a mutual authentication process between the client 200 and server 250 takes place. As described above, the mutual authentication process comprises a client authentication and a server authentication, each further comprising two steps to ensure that the communicating party is authenticated. Resulting from the mutual authentication process or once the session is created and established at 210 and 266 of the client 200 and the server 250, respectively, a set of session credential information is generated. The session credential information comprises a session ID, a session key and a session cipher. The session ID is used to distinguish the session from other sessions that the host is creating or has already established with other mobile devices or clients, and the session key and the session cipher are to encrypt transactions between the client 200 and the server 250. At 212, the client 200 has acknowledged that there is a rendezvous associated with the account designated to the client 200. If the user desires to update his personalized information in the account created and authorized in the server 250, he may proceed at 214 with the rendezvous that is generally identified by a URL provided by the host 250 and is subsequently prompted for a set of user credential information, such as a username and a password. At 216, the user credential information is entered. The credential information is then sent to the server 250 at 218, which includes a process of ensuring the newly supplied username and password satisfy a general rule of being a username and a password. The username/password ensuring process has been discussed above and the code listing thereof is in U.S. Pat. No. 6,233,608.

Meanwhile, as is shown in FIG. 5.b, the host 250 has acknowledged that the client 200 is about to receive a set of new user credential information and expects it therefrom at 268. As soon as the new user credential information has arrived, the server 250 updates the user credential information associated with the rendezvous at 270. In other words, to pass through the rendezvous to the user account now by other devices, the new credential information must be provided.

Figure 6:
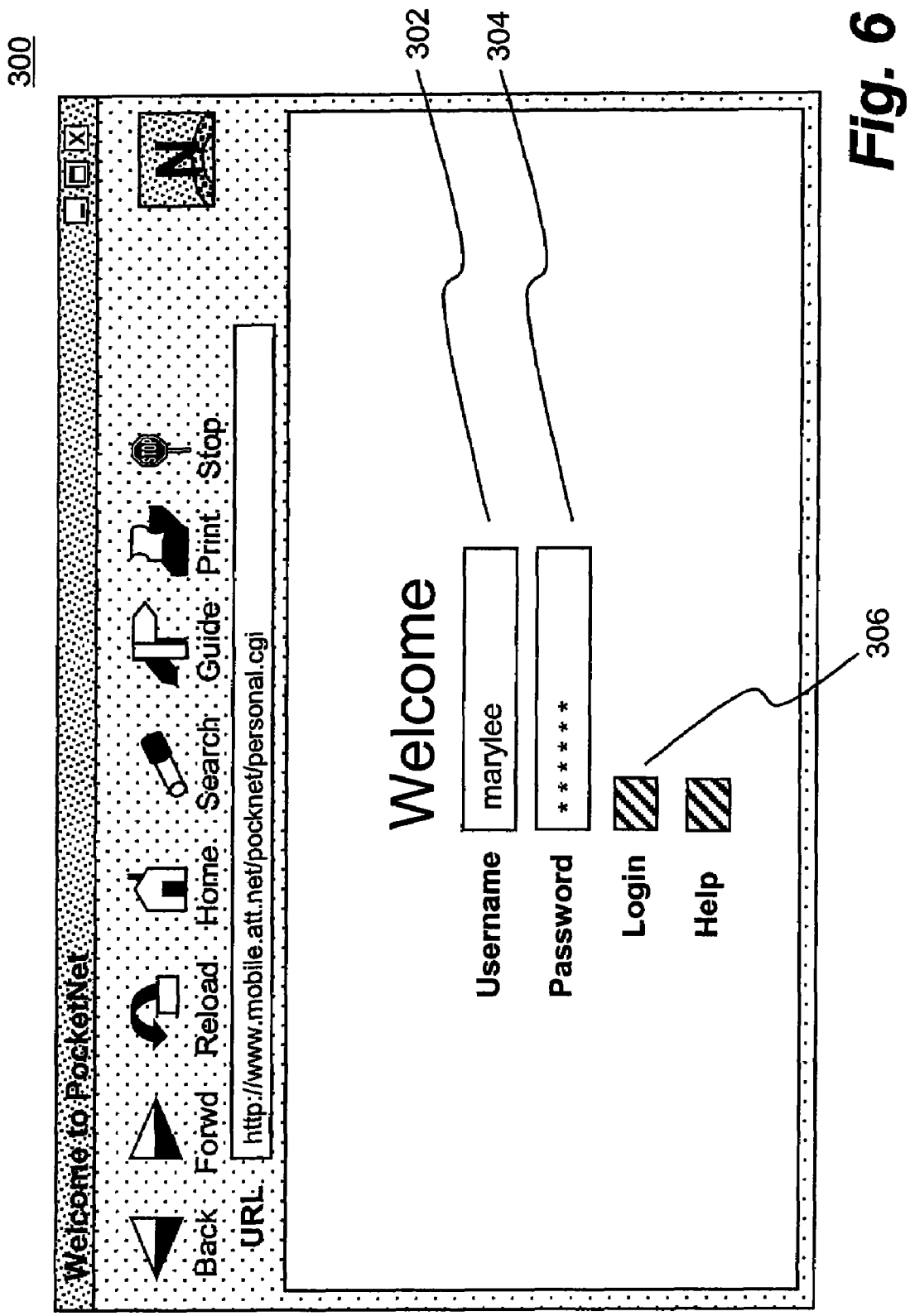
FIGS. 6, 7, 8, 9 and 10 illustrate examples of personalizing a user account being accessed through a self-provisioned rendezvous.
Figure 7:
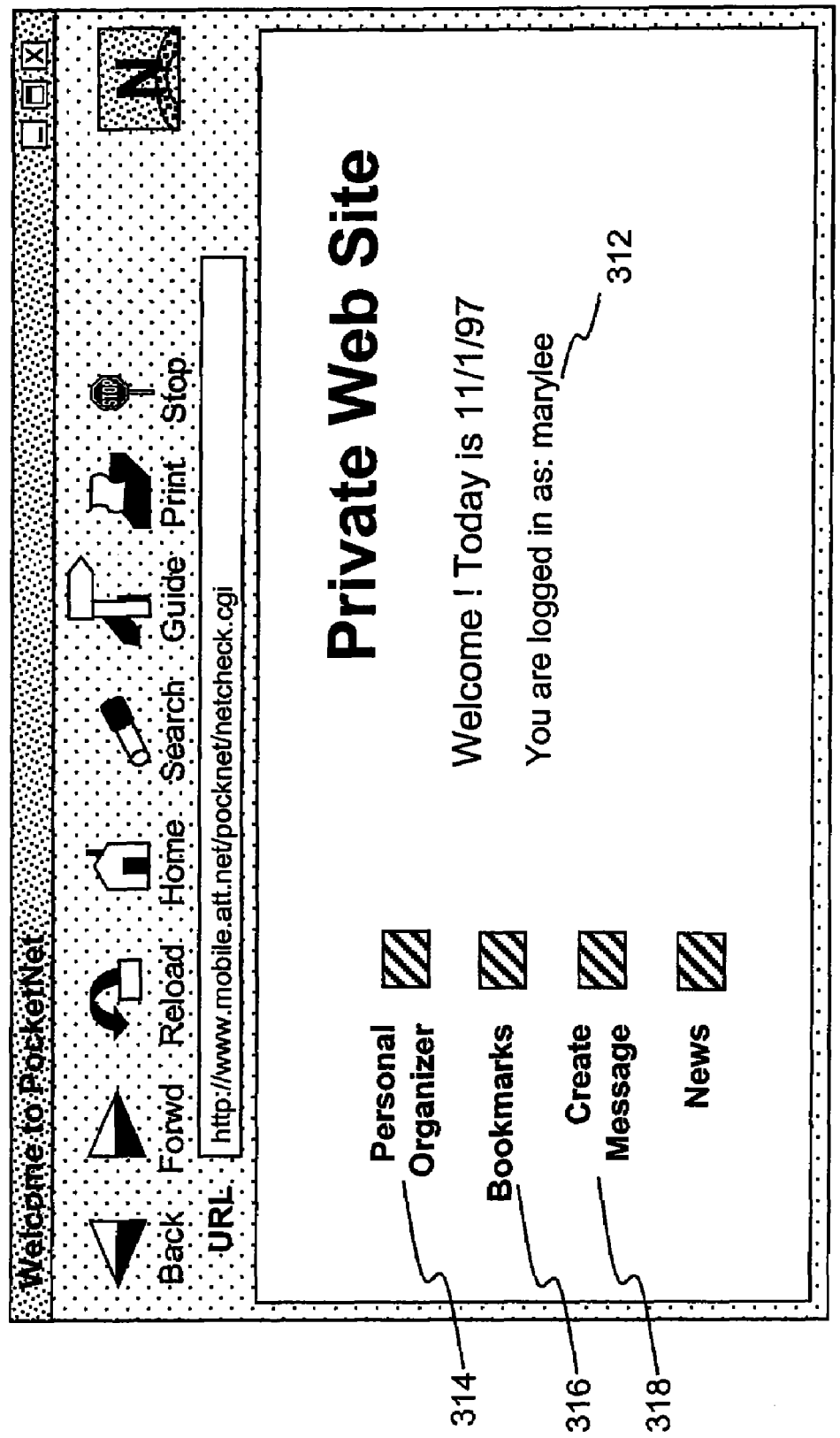
Figure 8:
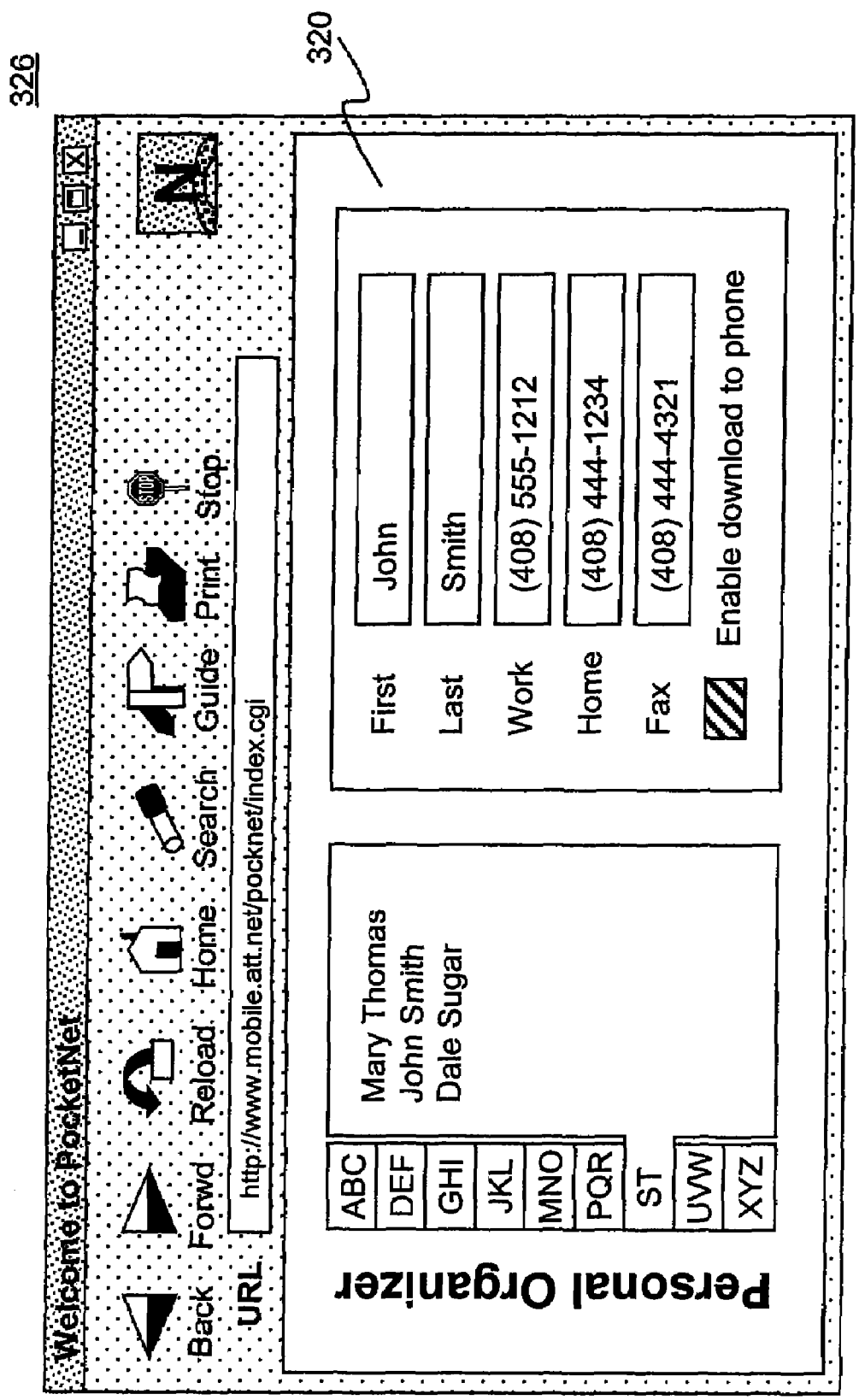
Figure 9:
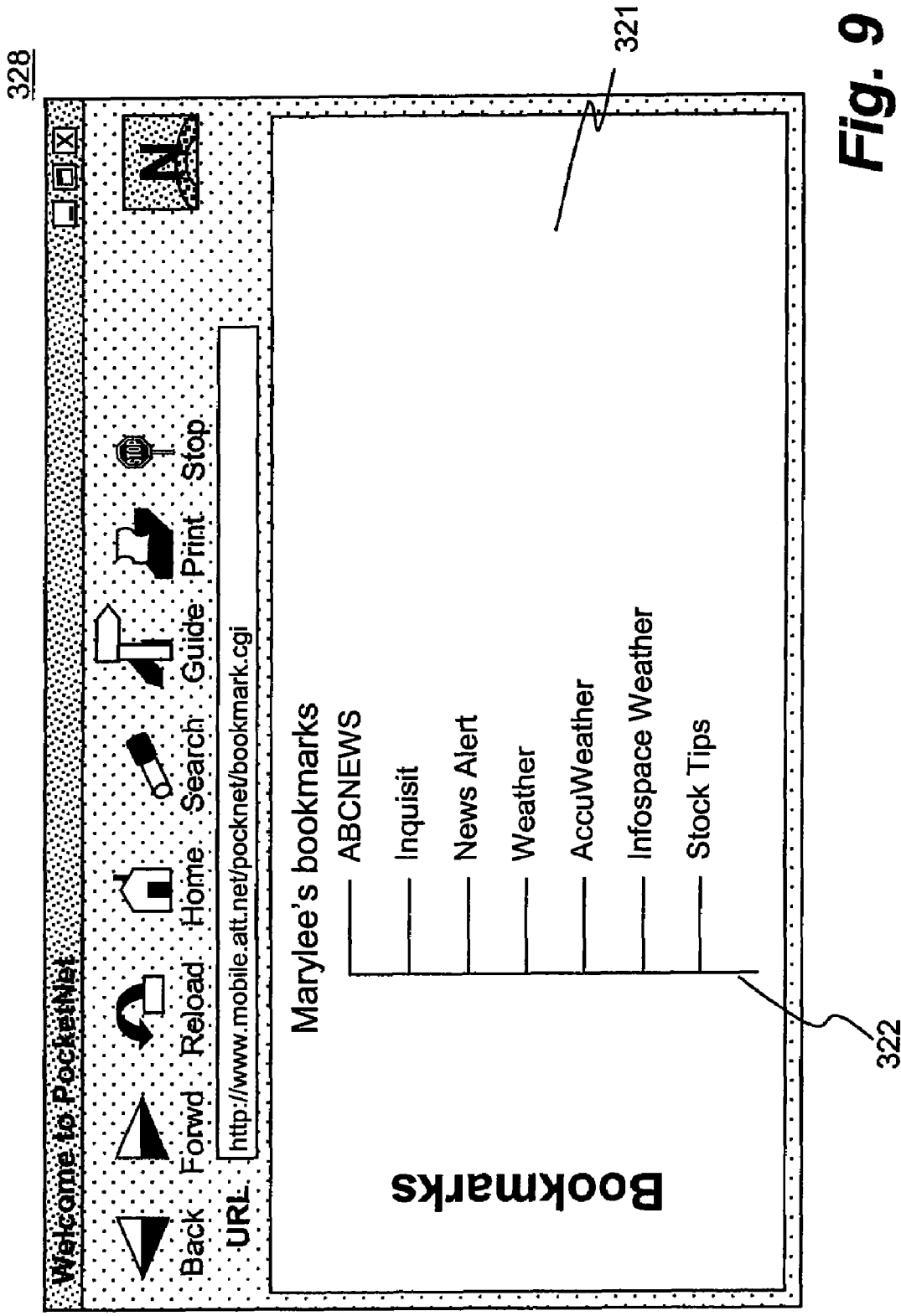
Figure 10:
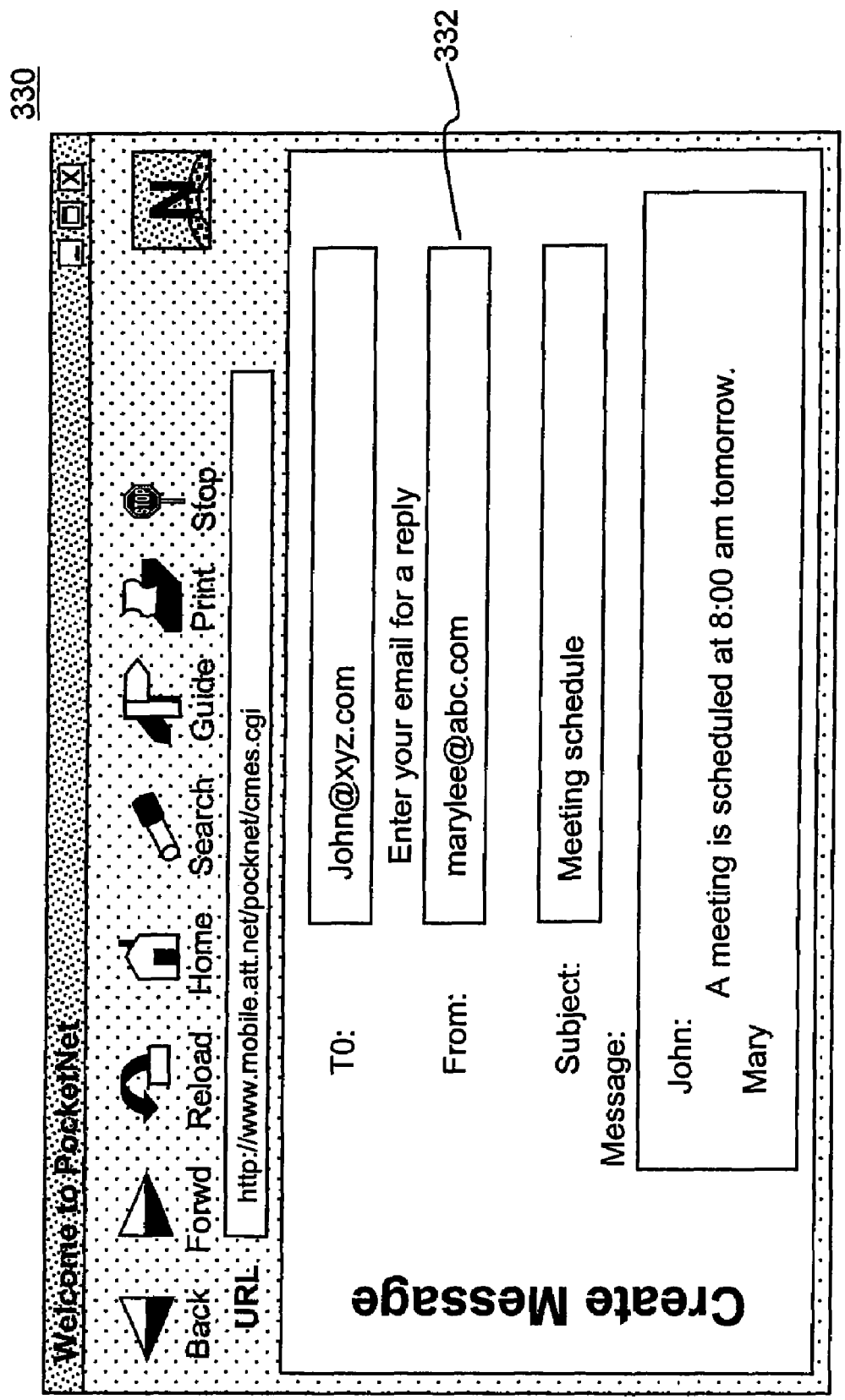

With the newly updated user credential information, the user can now log onto the rendezvous from any computer in the data network. A PC connected to the data network (not shown), is equipped with a familiar HTML-based browser. As an example, it is assumed that a user has just provisioned a rendezvous with a username being "marylee" and the corresponding password being "123456". The user now goes to a networked PC that runs a browser and logs onto the rendezvous based on the URL of the rendezvous. FIG. 6 shows an interactive web page 300 received from the server after the PC makes the connection to the rendezvous. It is understood to those skilled in the art that the page and subsequent pages can be constructed with HTML along with CGI script/Java applets, where the process, "CGI" stands for Common Gateway Interface, to receive information entered from a user. To update his personalized information in his account, the user must provide the newly created username and password required at 302 and 304, respectively. It should be noted that the password entered is generally not echoed at 304 and instead indicated with an asterisk corresponding to each letter entered. When the login icon 306 is activated, the entered username and password are retrieved and sent, through the network, to the server in which the entered username and password are verified; namely, the entered username and password match those entered and authorized by the user through the client. The user is then prompted with a second web page 310, shown in FIG. 7, in which the username is displayed as referenced by 312. To categorize personalized information in the account, the web page 310 comprises entries to other specific service pages, such as a Personal Organizer 314, Bookmarks 316 and Create Message 318. All these pages are accessible by the user to personalize his desired information therein. FIG. 8, for example, is a page 326 of the Personal Organizer 314 showing a personalized address book 320 that allows the user to edit his frequently contacted people's phone numbers and other information. FIG. 9 is a page 328 of the Bookmarks 316 showing personalized bookmarks 321 that allows the user to establish a list of web sites he may frequently visit through his cellular client. For example, StockTIPS referenced by 322 allows the user to keep a list of stock symbols there. With the personalized bookmarks, the user, when on the go, can quickly enter into the web pages in his list related to stock to find the prices thereof currently being traded in the stock market without keying in any symbols at all. As a convenient feature, a page 330 in FIG. 10 allows the user to create an email message and be replied to at a different address 332 as decided by the user, which eliminates the inconvenience of typing a lengthy message through a phone keypad and reading a replied message at the small screen in the client.

The contents in the exemplary pages shown in FIGS. 6, 7, 8, 9 and 10 composed by HTML are accessible by an HDML browser through a server providing communication protocol mapping and markup language translation functions. Similarly, information or messages entered on the client composed by HDML are equally accessible by any computer equipped with an HTML browser through the same server in the data network. The duality of the information updating through two different mark-up languages provides a useful means for efficiently managing a personal account and substantially solves the problems of inconvenient data entry through a less functional keypad.

The present invention has been described in sufficient detail with a certain degree of particularity. It is understood to those skilled in the art that the present disclosure of embodiments has been made by way of example only and that numerous changes in the arrangement and combination of parts as well as steps may be resorted without departing from the spirit and scope of the invention as claimed. For example, any mobile devices equipped with a micro browser, e.g., HDML browser, may be connected, using an adapter, to the Internet directly without going through the airnet. The emerging Internet-enabled electronic appliances are also Internet-connected, all have limited computing power and keypads but are capable of communicating with a server in a data network. The mutual authentication between such devices and the server thus becomes less complicated. The mutual authentication needs a process of having the client, such as a controller of the electronic appliance, authenticated by the server and having the server authenticated by the client. The process can be carried out in existing encryption mechanisms in HTTPS (an extended version of HTTP with built-in security), in which case, the link server could be replaced by a built-in capability in the device, or the HTTPS or the transceiver or somewhere in the connection to the Internet. The principles of the present invention may still be practiced in such configuration. Accordingly, the scope of the present invention is defined by the appended claims rather than the foregoing description of one embodiment.

What is claimed is:

1. An apparatus for accessing data contained in a data network system, comprising:
   a memory containing program code for a server module;
   a processor, coupled to the memory, and capable of executing the program code to enable the server module to perform the operations of:
      hosting the data, the data associated with an account for a mobile device, the device having a display screen, and the data being accessible by a computing device remotely located and coupled to a data network selected from a group consisting of the Internet, a private network and a network of private and public networks;
      receiving a request from the mobile device through a wireless data network to access the data;
      retrieving the data after the request is authenticated with respect to the account; and
      forwarding the data to the mobile device in a first format displayable on the display screen of the mobile device.

2. The apparatus of claim 1, wherein the processor further enables the server module to perform the operations of:
   prompting the computing device for credential information when the computing device accesses the data;
   providing access to the data in a second format after the credential information is verified; and
   updating the data upon receiving updated information from the computing device.

3. The apparatus of claim 1, wherein the data is presented to the computing device in a second format, and further, wherein the first format is a first markup language and the second format is a second markup language.

4. The apparatus of claim 3, wherein the first format is used to display the data on the mobile device and the second format is used to display the data on the computing device.

5. The apparatus of claim 1, wherein the data comprises a plurality of hyperlinks, and further, wherein the retrieving further comprises:
   contacting a resource identified by the one of the hyperlinks over the data network;
   fetching the data in a second format from the resource; and
   converting the fetched data to the first format.

6. The apparatus of claim 1, wherein the data comprises data for configuring or re-configuring a feature of the mobile device.

7. The apparatus of claim 1, wherein the mobile device is a wireless telephone.

8. The apparatus of claim 1, wherein the mobile device includes a processor, and further, wherein the processor controls a telephony function.

* * * * *

(12) EX PARTE REEXAMINATION CERTIFICATE (10477th)

United States Patent
Laursen et al.

(10) Number: US 7,813,714 C1
(45) Certificate Issued: Jan. 16, 2015

(54) APPARATUS FOR ACCESSING A COMMON DATABASE FROM A MOBILE DEVICE AND A COMPUTING DEVICE

(75) Inventors: Andrew L. Laursen, San Mateo, CA (US); Bruce K. Martin, Jr., Palo Alto, CA (US); Alain S. Rossmann, Palo Alto, CA (US)

(73) Assignee: Unwired Planet, LLC, Reno, NV (US)

Reexamination Request:
No. 90/013,407, Nov. 24, 2014

Reexamination Certificate for:
Patent No.: 7,813,714
Issued: Oct. 12, 2010
Appl. No.: 11/875,544
Filed: Oct. 19, 2007

Related U.S. Application Data

(60) Division of application No. 10/870,852, filed on Jun. 16, 2004, now Pat. No. 7,328,030, which is a division of application No. 09/410,859, filed on Oct. 1, 1999, now Pat. No. 6,895,234, which is a continuation of application No. 08/987,346, filed on Dec. 9, 1997, now Pat. No. 6,065,120.

(51) Int. Cl.
*H04M 11/00* (2006.01)
*H04W 72/00* (2009.01)
*H04B 1/38* (2006.01)

(52) U.S. Cl.
USPC ........ 455/405; 455/406; 455/456.1; 455/566; 705/2; 705/42; 709/203; 709/217; 709/218; 709/223; 709/229; 713/169; 713/171

(58) Field of Classification Search
None
See application file for complete search history.

(56) References Cited

To view the complete listing of prior art documents cited during the proceeding for Reexamination Control Number 90/013,407, please refer to the USPTO's public Patent Application Information Retrieval (PAIR) system under the Display References tab.

*Primary Examiner* — Ovidio Escalante

(57) ABSTRACT

The present invention has been made in consideration of thin devices efficiently communicating ideas and transactions into data networks by using other devices with full functional user interface in the networks. According to one aspect of the present invention, the thin device exclusively controls the authentication of a rendezvous that is associated with a user account in a server. The thin device running a micro-browser provisions the rendezvous with a set of credential information in an authenticated and secure communication session so that the provisioning process is truly proprietary. To access the user account, the other devices equipped with well-known browsers must submit the correct credential information to the rendezvous for verification in the server. Once admitted, the other devices can update managed information in the user account, individually and respectively, thereby the thin device is able to conduct desired transactions based on the managed information in the user account without the need to key in pertinent information of the transactions.

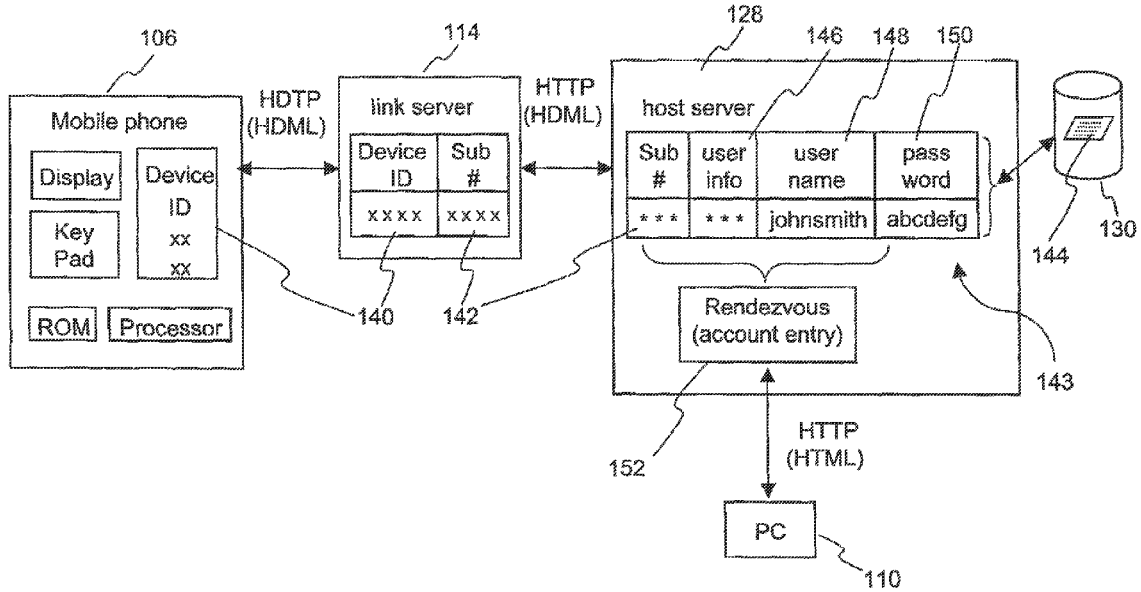

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2 and 6 are determined to be patentable as amended.

New claims 9-18 are added and determined to be patentable.

Claims 3-5, 7 and 8 were not reexamined.

1. An apparatus for accessing data contained in a data network system, comprising:
   a memory containing program code for a server module;
   a processor, coupled to the memory, and capable of executing the program code to enable the server module to perform the operations of:
      hosting the data, the data associated with an account for a mobile device, the *mobile* device having a display screen, and the data being accessible by a computing device remotely located and coupled to a data network selected from a group consisting of the Internet, a private network and a network of private and public networks;
      *participating in a provisioning process by:*
         *(i) participating in a secure connection session with the mobile device;*
         *(ii) receiving user credential information from the mobile device in the secure connection session; and*
         *(iii) provisioning the account with the user credential information;*
      receiving a request from the mobile device through a wireless data network to access the data, *the request being associated with the user credential information*;
      retrieving the data after the request is authenticated with respect to the account; and
      forwarding the data to the mobile device in a first format displayable on the display screen of the mobile device.

2. The apparatus of claim 1, wherein the processor further enables the server module to perform the operations of:
   prompting the computing device for *the user* credential information when the computing device accesses the data *associated with the account for the mobile device*;
   providing access to the data *associated with the account for the mobile device* in a second format after the *user* credential information is verified; and
   updating the data *associated with the account for the mobile device* upon receiving updated information from the computing device.

6. The apparatus of claim 1, wherein the data *associated with the account for the mobile device* comprises data for configuring or re-configuring a feature of the mobile device.

*9. The apparatus of claim 1, wherein the secure connection session is established using HTTPS.*

*10. The apparatus of claim 1, wherein the processor is configured to execute the program code to perform a first authentication process to assist in establishing the secure connection session, the first authentication process being different than a second authentication process used by the computing device to access the data associated with the account for the mobile device.*

*11. The apparatus of claim 1, wherein the user credential data comprises a username and password associated with a user of the computing device.*

*12. The apparatus of claim 1, wherein the processor is configured to execute the program code to, when the user account has not yet been provisioned with user credential information, provision initial credential information for enabling access to the data associated with the account for the mobile device.*

*13. The apparatus of claim 1, wherein the processor is configured to execute the program code to, when the user account has been pre-provisioned with user credential information, provision updated credential information for enabling access to the data associated with the account for the mobile device.*

*14. The apparatus of claim 1, wherein the data associated with the account for the mobile device is updatable by the computing device prior to being received by the mobile device.*

*15. The apparatus of claim 1, wherein the processor is further capable of executing the program code to further enable the server module to perform the operations of:*
   *receiving a request from the computing device through the data network to access the data the request being associated with the user credential information;*
   *retrieving the data after the request from the computing device is authenticated with respect to the account; and*
   *forwarding the data to the computing device in a format displayable on a display screen of the computing device.*

*16. The apparatus of claim 1, wherein the account for the mobile device is associated with a user identifier specific to the user of the mobile device.*

*17. The apparatus of claim 1, wherein the account for the mobile device is associated with a device identifier specific to the mobile device.*

*18. The apparatus of claim 1, wherein the account for the mobile device is associated with both a user identifier specific to the user of the mobile device and a device identifier specific to the mobile device.*

* * * * *